United States Patent [19]

Sullins

[11] 4,042,510
[45] Aug. 16, 1977

[54] LIQUID AERATION DEVICE

[75] Inventor: John K. Sullins, Kingsport, Tenn.

[73] Assignee: Canton Textile Mills, Inc., Canton, Ga.

[21] Appl. No.: 719,996

[22] Filed: Sept. 2, 1976

[51] Int. Cl.² .......................... C02B 1/34; B01F 3/04
[52] U.S. Cl. ................................. 210/220; 210/255; 261/119 R; 261/DIG. 75
[58] Field of Search ................. 210/14, 15, 63 R, 170, 210/220, 221 R, 255, 262, 60, 209; 261/113, 114 R, 119 R, DIG. 75, 125

[56] References Cited

U.S. PATENT DOCUMENTS

| 322,104 | 7/1885 | Hyatt | 210/209 |
|---|---|---|---|
| 370,016 | 9/1887 | Hyatt | 210/60 |
| 543,410 | 7/1895 | Taylor | 261/DIG. 75 |
| 543,411 | 7/1895 | Taylor | 261/DIG. 75 |
| 895,229 | 8/1908 | Beddoes | 210/15 |
| 1,299,059 | 4/1919 | Taylor | 261/114 R |
| 1,563,981 | 12/1925 | Helander | 261/113 |
| 2,013,577 | 9/1935 | Pardee | 261/114 R |
| 2,374,772 | 5/1945 | Nordell | 210/209 X |
| 3,976,575 | 8/1976 | Sullins | 210/220 |

FOREIGN PATENT DOCUMENTS

| 180,535 | 12/1954 | Austria | 210/255 |
|---|---|---|---|
| 6,402 | 11/1906 | France | 210/255 |
| 951,153 | 10/1949 | France | 261/113 |

*Primary Examiner*—Wilbur L. Bascomb, Jr.
*Assistant Examiner*—Robert H. Spitzer
*Attorney, Agent, or Firm*—Walter M. Rodgers; Walter A. Rodgers

[57] ABSTRACT

A liquid aeration device comprises a receiver chamber having bottom and side walls and arranged to receive liquid to be aerated and including an aerator wall in which orifice means is formed through which water to be aerated flows, a vertically disposed downcomer conduit atop which said receiver chamber is mounted and which is arranged to receive water by free fall flowing through said orifice means and downwardly into said downcomer and a vertically disposed riser conduit concentrically arranged about said downcomer conduit with its lower end in communication with the lower end of said downcomer conduit. Cutaway areas may be formed along the top edge of the aerator wall to accommodate flow of liquid through and over the wall and a plurality of receiver chambers may be mounted one above the other and arranged in vertically staggered relationship so that water entering the topmost receiver chamber is allowed to flow in tortious paths downwardly and through orifice means associated with each receiver chamber and ultimately into the downcomer tube disposed therebelow. Several stages of downcomer conduits and riser conduits may be provided by concentric conduits having successively larger diameters and of successively shorter heights so as to increase the degree of aeration which is achievable.

8 Claims, 7 Drawing Figures

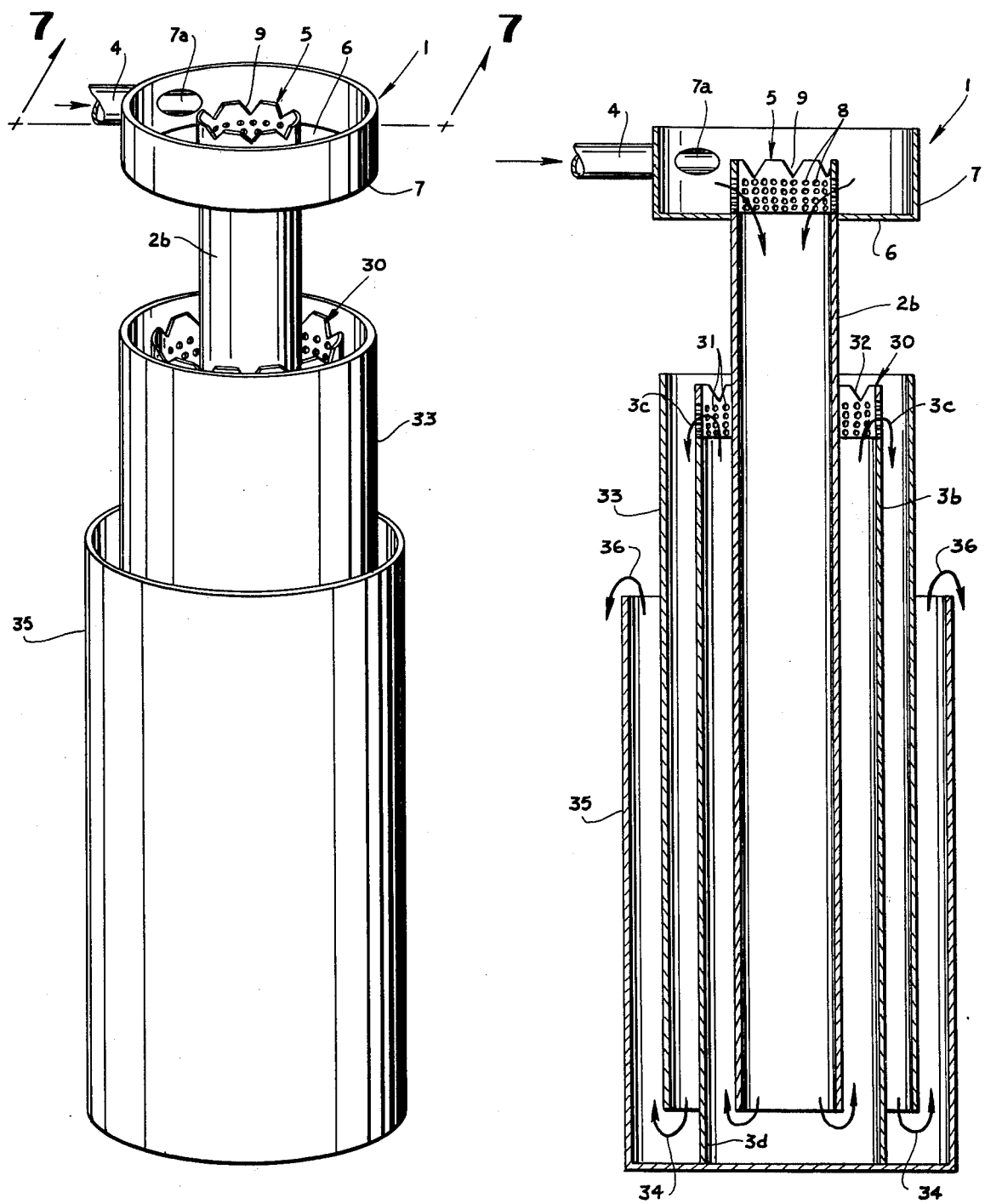

LIQUID AERATION DEVICE

U.S. Pat. No. 3,976,575 issued Aug. 24, 1976 and assigned to the same assignee as this invention, discloses and claims a liquid aeration device which utilizes some of the principles of this invention. The arrangement of the aforementioned patent is such that a substantial area is required in order to mount the device if a multiplicity of stages are employed. Since the degree of aeration achievable according to the principles of this invention and by the aforementioned patent is directly dependent upon the length of vertically disposed downcomer and riser tubes, it is necessary to provide structure having substantial vertical dimensions in one or more stages.

According to this invention, a compact arrangement is employed which arranges downcomer and riser tubes in a concentric structure which is economical in the use of vertical and horizontal space and which in many instances may be constructed of standardized preformed tubes which are generally circular in cross section or are of some other standardized cross sectional configuration thus effecting substantial economies. According to the invention in one form, a receiver chamber is arranged to receive liquid to be aerated and includes a vertically disposed aerator wall, orifice means formed in the aerator wall and arranged to accommodate flow of liquid from the receiver chamber and into a main downcomer conduit via free fall from said orifice means through atmospheric air, and a main riser conduit of larger transverse dimension than said main downcomer conduit and disposed generally concentrically thereabout, the upper end of said main riser conduit constituting discharge means and the lower ends of said main downcomer and of said main riser conduits being in fluid tight communication with each other.

For a better understanding of the invention, reference may be had to the following detailed description taken in conjunction with the accompanying drawings in which FIG. 1 is a perspective partially cutaway view of a liquid aerating device formed according to one form of the invention;

FIG. 6 is a perspective view somewhat similar to FIG. 1 but which shows a two stage aerator arrangement utilizing the principles of FIG. 1; and in which FIG. 7 is a cross sectional view taken along the line designated 7—7 in FIG. 6.

Figure 1:
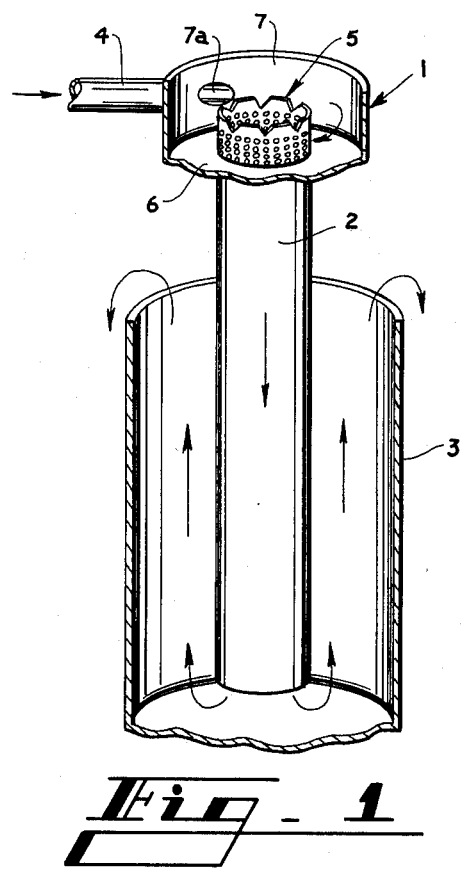
Figure 3:
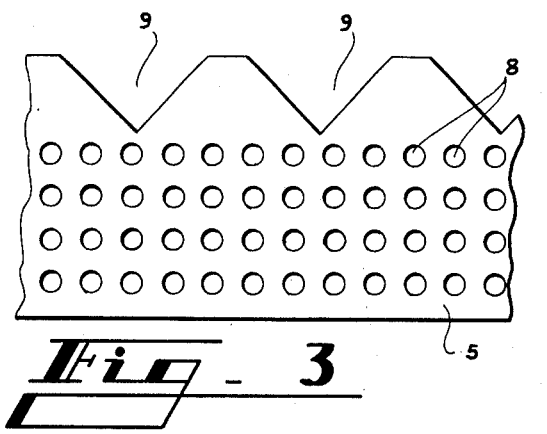
FIG. 3 is a fragmentary view of the aerator wall shown in FIGS. 1 and 2 and taken from the vantage point of the line designated 3—3 in FIG. 2.
Figure 2:
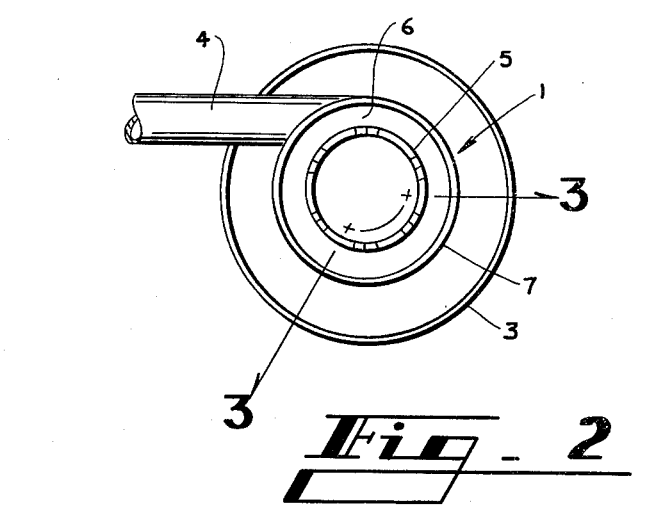
FIG. 2 is a top view of the arrangement shown in FIG. 1.

With reference to FIGS. 1, 2 and 3, the numeral 1 generally designates a receiver chamber which is mounted atop a downcomer conduit 2 about which a riser conduit 3 is disposed in generally concentric fixed relationship.

Figure 4:
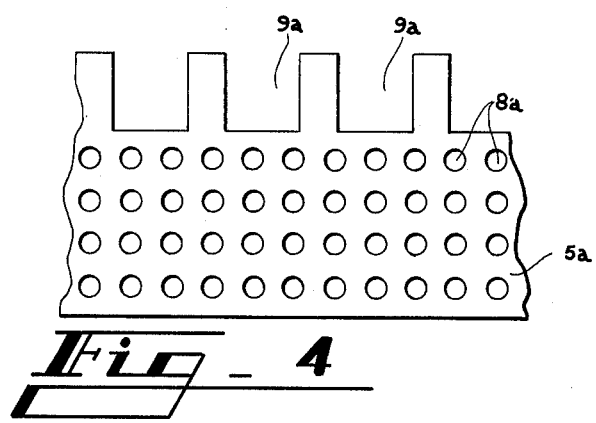
FIG. 4 is a view similar to FIG. 3 but shows an alternative structure.

The receiver chamber 1 is supplied with liquid to be aerated through a conduit designated by the numeral 4. An aerator wall generally designated by the numeral 5 is formed within the receiver chamber 1 and is in reality an upward continuation of downcomer conduit 2 which extends through an opening formed in bottom wall 6 to the periphery of which side wall 7 is secured. Obviously aerator wall 4 could be constructed as a separate part and need not constitute a continuation of downcomer conduit 2. Liquid to be aerated as shown in FIGS. 1 and 2 is supplied through an aperture 7a formed in side wall 7 and flows radially inward through orifices designated by the numeral 8 formed in aerator wall 5. If desired, liquid to be aerated could be injected inside the wall 5 provided the bottom of that structure were closed and such water could be allowed to flow radially outward through orifices 8 and then downwardly into downcomer conduit 2 provided appropriate openings were formed about the outer periphery of aerator wall 5 and which would allow liquid from the orifices 8 to fall through such apertures downwardly into conduit 2. Under these conditions, the diameter of conduit 2 would necessarily have to be increased or that of aerator wall 5 decreased. Needless to say it is simply essential that liquid to be aerated is allowed to flow through aerator orifices formed in aerator wall 5. As used herein the term "aerator orifices means" is deemed to include either the aperatures 8 or the cutaway areas 9 which in FIG. 3 are of V-shaped configuration and which by the arrangement of FIG. 4 could be of rectangular configuration as indicated at 9a or the term can include both apertures and cutaway areas.

As explained in the aforementioned U.S. Pat. No. 3,976,575, liquid flowing through the orifices 8 and in certain instances through the cutaway areas 9 or 9a, flows at reduced pressure which causes oxygen from atmospheric air to be placed in intimate contact with the liquid so as more easily to dissolve the oxygen in the liquid which by free fall proceeds downwardly from the orifice means and into the downcomer tube 2.

If the flow through inlet pipe 4 is greater than can be accommodated by the orifices 8, of course the overflow will proceed through the cutaway areas 9 or 9a as the case may be and may completely submerge the aerator wall 5 in weir like fashion. If flow is not so great, the entire quantity of liquid conceivably could be accommodated by the orifices 8 or 8a.

Liquid having trapped and received oxygen by virtue of the orifice means described above, then flows by free fall downwardly and then through downcomer tube 2 and upwardly through riser tube 3. As explained in U.S. Pat. No. 3,976,575, pressure applied to the liquid in the downcomer tube 2 and the riser tube 3 causes oxygen which is entrapped in the liquid to be forced into solution due to the pressure caused by the head of liquid in the downcomer conduit 2 and the riser conduit 3.

While the arrangement shown in FIG. 1 does not utilize orifices formed in the upper end of riser conduit 3, the upper end, called "discharge means" herein, could include orifices and cutaway notch areas if desired as shown in FIGS. 6 and 7.

The efficiency of aeration caused by flow of liquid through orifices 8 or 8a and through cutaway areas 9 and 9a is directly dependent on the interface area i.e. the area of liquid and air contact. Clearly the smaller the diameter of orifices 8 or 8a, the greater the interface area assuming a greater number of orifices.

While the arrangement disclosed in the drawings utilizes circular orifices, the invention is not limited to circular orifices and could employ openings of some other configuration if desired. Obviously if the liquid to be aerated contains solids, there is a practical limit as to how small the diameter of the orifices may be. In order to allow free access of atmospheric air to the liquid which has passed through the orifices, it is preferable to form the orifices 8 and 8a in such manner that their centers are spaced apart by distances at least equal to twice the diameter of the circular orifice apertures.

From the description thus far it is apparent that liquid to be aerated which is introduced through conduit 4 is supplied with oxygen by means of the orifices 8 or 8a and if need be by the cutaway areas 9 and 9a and an additional degree of aeration is achieved by the pressure due to the head of liquid in downcomer conduit 2 and riser conduit 3. The net result is that liquid which flows upwardly and out of the upper end of riser conduit 3 is aerated to a significant degree due to both of these factors namely the action of the orifice means and of the pressure in conduits 2 and 3, all as explained in the above mentioned U.S. Pat. No. 3,976,575.

Figure 5:
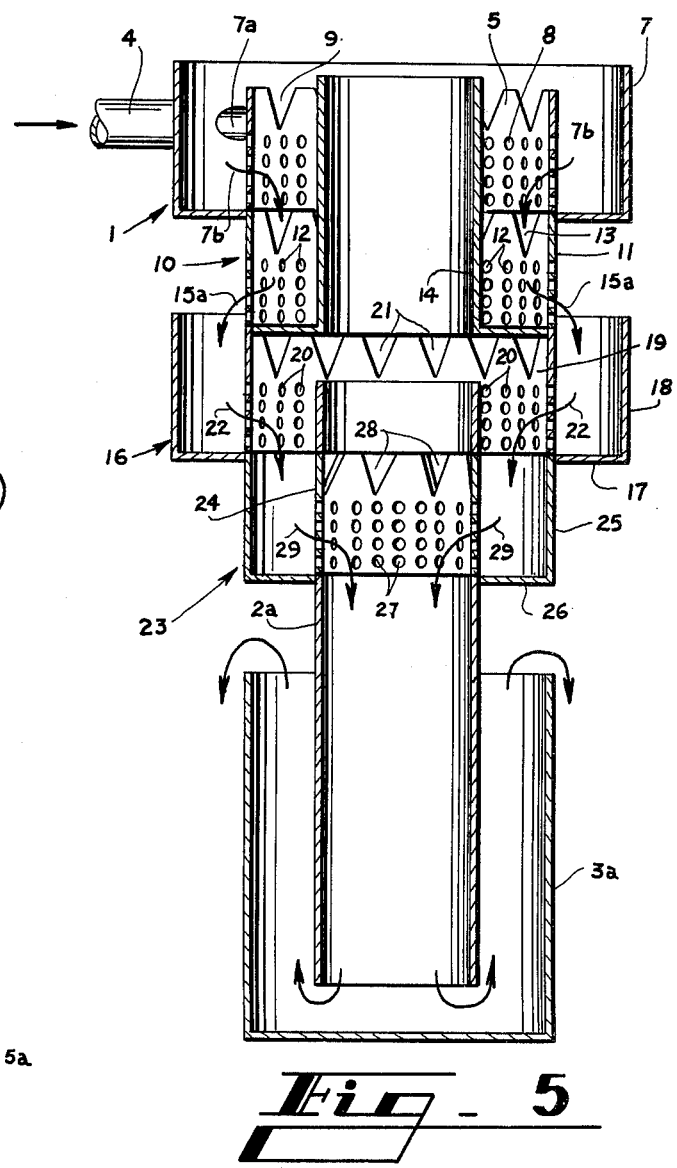
FIG. 5 is a cross sectional view of a modification of the invention in which a plurality of receiver chambers are employed.

The degree of aeration may be increased by the arrangement of FIG. 5 wherein a multiplicity of receiver chambers such as that designated by the numeral 1 are disposed one atop the other in a vertically aligned horizontally staggered arrangement. For example, the receiver chamber 1 which could be formed as shown and described in FIGS. 1, 2 and 3 is mounted atop a second receiver chamber designated by the numeral 10 having an aerator wall 11 in which orifices 12 are formed and along the top edge of which cutaway areas 13 are formed. An internal interior side wall 14 prevents liquid flowing through aerator wall 5 as indicated by arrow 7b and downwardly inside aerator wall 11 in the annular space between that wall and the annular wall 14 from falling downwardly through the downcomer tube 2a. Liquid from receiver chamber 10 which flows outwardly through orifice means 12 and 13 flows according to the arrows 15a downwardly into the receiver chamber generally designated at 16 having bottom wall 17 and side wall 18. Receiver chamber 16 as is apparent is of a construction which is similar to receiver chamber 1 and includes an aerator wall 19 having orifice apertures 20 and cutaway areas 21 formed therein so that liquid flowing in the direction indicated by arrows 22 passes downwardly into the receiver chamber generally designated at 23. Obviously receiver chamber 23 is of a construction smilar to receiver chamber 10 and includes an aerator wall 24 and disposed inside a side wall 25 secured about its edges to bottom wall 26. Aerator wall 24 includes orifice apertures 27 and notches 28 so that liquid flowing as indicated by arrows 29 is discharged into the upper end of downcomer conduit 2a. Of course liquid flowing downwardly in downcomer 2a flows upwardly through riser conduit 3a and outwardly through the upper discharge end thereof as is obvious. As is apparent from FIG. 5, chambers 1 and 16 are in substantially vertical alignment as are alternate chambers 10 and 23.

The arrangement of FIG. 5 achieves a greater degree of aeration than does the arrangement of FIGS. 1, 2 and 3 for the obvious reason that the aggregate aeration achieved is the result of the action of receiver chambers 1, 10, 16 and 23 as well as that achieved by the downcomer conduit 2a and the riser conduit 3a.

Not only is this invention adaptable for use as a multistage structure as shown in FIG. 5, the arrangement is efficiently adaptable for use as a multistage device as shown in FIGS. 6 and 7. As is apparent in FIGS. 6 and 7, the receiver chamber 1, which is constructed in a manner identical to that shown in FIGS. 1, 2 and 3, is mounted atop a downcomer conduit designated 2b. In addition the riser conduit 3b includes discharge means generally designated at 30 and formed in its upper end which includes orifice apertures 31 and cutaway areas 32 so that liquid passing through the discharge means 30 in the upper end of riser conduit 3b is allowed to fall downwardly by free fall as indicated by the arrows 3c and into the upper end of downcomer conduit 33 which is generally circular and which is disposed about the riser conduit 3b. As is apparent from FIG. 7, riser conduit 3b at its lower end designated 3d isolates the main riser conduit 3b from the auxiliary downcomer conduit 33 so that liquid flowing downwardly in the space between downcomer conduit 33 and riser conduit 3b flows in a direction indicated by arrow 34 and thence upwardly through auxiliary riser conduit 35 and outwardly through the upper end thereof as indicated by the arrow 36.

From the arrangement as shown in FIGS. 6 and 7, it is apparent that additional stages can be added by simply employing conduits of larger and larger diameter and of progressively shorter height so that a device having many stages can be employed as is obvious from FIGS. 6 and 7.

Since the arrangement of U.S. Pat. No. 3,976,575 is a box like structure having square corners, the orifice means must be formed in a transverse wall so that the length of the aerator wall is limited. According to this invention the length of the aerator wall such as that designated by the numeral 5 is considerably greater and its capacity therefore can be greater. Conversely since the length (circumference) of the aerator wall 5 is greater according to one feature of this invention, the height of the wall may be reduced and by this means the overall head loss may be reduced thus improving the efficiency of pressure applied by the downcomer and riser structures. Furthermore the concentric arrangement of the downcomer and riser conduits lends itself to construction of a multistage arrangement simply by employing additional tubes of larger diameter thus conserving the space required. If need be, the degree of aeration may also be increased simply by arranging a vertical column of receiver chambers as shown in FIG. 5 and by this means the efficiency of the device is still further improved in a structure which is compact and efficient. Of course these arrangements could all be employed in a common device i.e. a multiple receiver chamber structure as shown in FIG. 5 could be combined with a multistage device as shown in FIG. 7. Furthermore if the liquid to be aerated contains solids and if such solids tend to clog up certain of the orifice apertures 8, aeration is still achieved by the action of the cutaway areas such as 9 or 9a according to a feature of the invention.

While the structural arrangements of the downcomer and riser conduits as shown in the drawing are circular in cross section, it will be understood that some other cross sectional configuration such as elliptical or rectangular could be employed if desired.

For some applications of the invention, it may be desirable to eliminate the orifice apertures 8 or 8a altogether and simply to utilize cutaway areas such as 9 or 9a particularly where the liquid to be aerated includes relatively large solid particles. Likewise for some applications of the invention reliance may be placed entirely on orifice apertures such as 8 and 8a and the cutaway areas such as 9 and 9a eliminated.

The embodiments of the invention in which an exclusive property or privilege is claimed are defined as follows:

1. A liquid aeration device comprising a receiver chamber for receiving liquid to be aerated and having a vertically disposed aerator wall, aerator orifices formed in said aerator wall, a main vertically disposed downcomer conduit with its upper end arranged to receive liquid from said aerator orifices via free fall from said aerator orifices through atmospheric air, a main riser conduit of larger transverse dimensions than said main downcomer conduit and disposed about said main downcomer conduit, the upper end of said main riser conduit constituting discharge means including a plurality of orifices formed in said main riser conduit and the lower ends of said main downcomer and of said main riser conduits being in fluid tight communication with each other so that liquid which flows downwardly in said main downcomer conduit and which has dissolved and entrapped air therein is caused to flow upwardly in said main riser conduit without escape of liquid or of air except at said discharge means, an auxiliary downcomer conduit of larger transverse dimensions than said main riser conduit disposed about said main riser conduit and arranged to receive liquid by free fall through atmospheric air from said discharge means formed in the upper end of said main riser conduit, and an auxiliary riser conduit of larger transverse dimensions than said auxiliary downcomer conduit disposed about said auxiliary downcomer conduit and arranged with its lower end in communication with the lower end of said auxiliary downcomer conduit.

2. A device according to claim 1 wherein the lower ends of said main and of said auxiliary downcomer conduits are isolated from each other.

3. A device according to claim 1 wherein the lower ends of said main and of said auxiliary downcomer conduits are isolated from each other in part at least by the lower end of said main riser conduit.

4. A liquid aeration device comprising a plurality of vertically stacked horizontally staggered receiver chambers each having bottom and side walls and each having aerator orifices formed in a side wall and arranged so that liquid in each receiver chamber flows through its aerator orifices and downwardly by free fall through atmospheric air and, except for the lowermost receiver chamber, into the receiver chamber immediately therebelow, said receiver chambers being mounted atop a main downcomer conduit and discharge from the lowermost one of said receiver chambers being into said main downcomer conduit and alternate ones of said receiver chambers being in substantially vertical alignment and flow of liquid through said chambers being along tortious paths.

5. A liquid aeration device comprising a receiver chamber for receiving liquid to be aerated and having a vertically disposed aerator wall, aerator orifices formed in said aerator wall, a main vertically disposed downcomer conduit with its upper end arranged to receive liquid flowing through said aerator orifices via free fall from said aerator orifivces through atmospheric air, a main riser conduit of larger transverse dimensions than said main downcomer conduit and disposed about said main downcomer conduit, the upper end of said main riser conduit constituting discharge means and the lower ends of said main downcomer and of said main riser conduits being in fluid tight communication with each other so that all of the liquid which flows downwardly in said main downcomer conduit and which has dissolved and entrapped air therein is caused to flow upwardly in said main riser conduit without escape of liquid or of air except at said discharge means, said aerator wall constituting an upwardly extending continuation of said main downcomer conduit which projects through an opening formed in the bottom wall of said receiver chamber, and said aerator wall comprising a generally vertically disposed continuous wall structure mounted within said receiver chamber so that liquid flows inwardly through said aerator orifices and then downwardly into said main downcomer conduit.

6. A device according to claim 5 wherein said orifice means comprises a plurality of notches formed in the top edge of said aerator wall.

7. A device according to claim 6 wherein said notches are V-shaped.

8. A device according to claim 6 wherein said notches are of rectangular configuration.

* * * * *